US006009993A

United States Patent [19]

Turcheck, Jr.

[11] Patent Number: 6,009,993

[45] Date of Patent: Jan. 4, 2000

[54] BUCKET CONVEYOR APPARATUS HAVING IMPROVED INFEED STATION

[75] Inventor: Stanley P. Turcheck, Jr., Homer City, Pa.

[73] Assignee: FMC Corporation, Chicago, Ill.

[21] Appl. No.: 08/784,428

[22] Filed: Jan. 16, 1997

[51] Int. Cl.[7] .......... B65G 47/40

[52] U.S. Cl. .......... 198/708; 198/792

[58] Field of Search .......... 198/708, 792

[56] References Cited

U.S. PATENT DOCUMENTS

| | | | |
|---|---|---|---|
| 631,718 | 8/1899 | Hunt et al. | 198/708 |
| 1,106,404 | 8/1914 | Perkins | 198/708 |
| 4,232,782 | 11/1980 | Ikeda et al. | 198/708 |
| 4,284,191 | 8/1981 | Lavau | 198/792 |
| 4,417,938 | 11/1983 | Sigl | 198/782 |
| 4,493,413 | 1/1985 | Harrell | 198/708 |
| 4,722,433 | 2/1988 | Gough | 198/706 |
| 4,842,121 | 6/1989 | Michalon | 198/792 |
| 5,105,933 | 4/1992 | Gough | 198/706 |
| 5,641,057 | 6/1997 | Chorlton | 198/792 |

FOREIGN PATENT DOCUMENTS

| | | | |
|---|---|---|---|
| 2812189 | 9/1979 | Germany | 198/708 |
| 12505 | 1/1986 | Japan | 198/708 |

*Primary Examiner*—Dean J. Kramer
*Assistant Examiner*—Douglas Hess
*Attorney, Agent, or Firm*—Rockey, Milnamow & Katz, Ltd.

[57] ABSTRACT

A bucket conveyor apparatus includes one or more conveyor chains, and a plurality of conveyor buckets which are pivotally mounted on the conveyor chains. While the buckets are positioned in spaced apart relationship along the chains, the present apparatus includes an arrangement for relatively reducing this relative spacing at an infeed station of the apparatus. An arrangement of guide members is provided for relatively reducing the effective length of the conveyor chains thereby relatively reducing the spacing between the conveyor buckets at the infeed station. Efficient loading of material into the buckets is thus facilitated since spillage of material between the buckets during loading is substantially abated.

19 Claims, 3 Drawing Sheets

10 12 14 16 18 20 22 23 24 30 34 34 44 3 3

12
16
18
20
22
23
24
30
32
34
36
40

12
48
44b
44a
42
44
48
44
42
38
38
14
30
36
20
35
16
16
29
32
24
24
28
50
50
36

42
42
44
46
36
38
36

20
36
36
38
38
16
44
42
14
28
29

BUCKET CONVEYOR APPARATUS HAVING IMPROVED INFEED STATION

TECHNICAL FIELD

The present invention relates generally to a bucket conveyor apparatus such as for handling particulate material, and more particularly to a conveyor apparatus having an improved infeed station configured to relatively reduce the spacing between buckets of the conveyor to thereby facilitate filling of the buckets.

BACKGROUND OF THE INVENTION

Bucket conveyor systems are frequently employed for handling of particulate material or the like, including movement of such material between vertically spaced locations. In such a system, a plurality of individual buckets are typically mounted on one or more conveyor chains, or like elements, with the chains guided and driven about sprockets or like guide elements to move the buckets along the desired path. The buckets are typically pivotally connected to each of the conveyor chains, and thus are configured to remain in a substantially upright orientation as the buckets are moved horizontally or vertically with the conveyor chains. Such arrangements are well-suited to handling of particulate materials, which materials can be introduced into the buckets at an infeed station, and discharged from the buckets at a discharge station, typically by effecting inversion of the buckets at the discharge station.

U.S. Pat. No. 4,722,433 and U.S. Pat. No. 5,105,933 disclosed heretofore known bucket conveyor systems, with these patents hereby being incorporated by reference.

Because the buckets of a typical bucket conveyor system are configured to pivot relative to the one or more associated conveyor chains as the buckets are moved along the conveying path, the buckets are typically positioned in spaced apart relationship to each other along the length of the conveyor chains thereby assuring that the buckets do not interfere with one another as they pivot relative to the conveyor chains. However, this necessary spacing detracts from efficient filling of the buckets since material can spill between the relatively spaced buckets during filling.

The present invention contemplates an arrangement for facilitating filling of buckets of a bucket conveyor apparatus by selectively relatively reducing the spacing between the buckets at an infeed station of the apparatus.

SUMMARY OF THE INVENTION

A bucket conveyor apparatus embodying the principles of the present invention includes an infeed station at which material is introduced into the buckets of the apparatus. While the buckets of the apparatus are ordinarily conveyed in spaced apart relationship to each other, the present invention contemplates a guide arrangement which acts to relatively reduce the length of the one or more conveyor chains which carry the buckets, thereby relatively reducing the spacing between the buckets at the infeed station. Spillage of material between the buckets is thus substantially abated attendant to loading, facilitating efficient material conveyance.

In accordance with the illustrated embodiment, the present conveyor apparatus includes an infeed station frame, and at least one first sprocket and at least one second sprocket rotatably mounted on the infeed station frame. At least one conveyor chain extends between the first and second sprockets to define an upper conveyor run and a lower conveyor run each extending at least partially between the first and second sprockets. In the illustrated form, a pair of first sprockets and a pair of second sprockets are rotatably mounted on the infeed station frame, with a pair of conveyor chains provided extending respectively between one of the first sprockets and one of the second sprockets in parallel relationship to each other. It is to be understood, however, that a conveyor apparatus embodying the present invention may include but a single conveyor chain.

A plurality of conveyor buckets are mounted on the one or more conveyor chains in spaced apart relationship to each other, with the buckets configured to receive particulate material or the like for conveyance. The apparatus includes a drive arrangement for driving the first and second sprockets for conjoint rotation to thereby effect movement of the conveyor chains, and the conveyor buckets mounted thereon, along the upper and lower conveyor runs. In the illustrated embodiment, the conveyor drive includes a timing chain which operatively interconnects the first and second sprockets for maintaining the sprockets in synchronous rotation with each other.

In accordance with the present invention, the conveyor apparatus includes one or more guide members positioned along at least a portion of the upper conveyor run. The guide members are configured to reduce the relative spacing between the conveyor buckets as the conveyor buckets are moved along this portion of the upper conveyor run to facilitate filling of the buckets. This reduction in relative spacing is effected by reducing the effective length of each of the conveyor chains as they move relative to the guide members. In particular, the guide members are configured to define first and second guide paths positioned in vertically spaced relationship to each other. Mounting elements of the conveyor chains upon which the conveyor buckets are pivotally mounted are guided along the first guide path, while portions of the conveyor chains intermediate each adjacent pair of mounting elements are guided along the vertically spaced second guide path. The conveyor chains are thus guided such that they assume a generally zig-zag-like configuration as they are moved through the guide members, thus acting to reduce their effective lengths, and relatively reduce the spacing between the conveyor buckets. Material can thus be efficiently introduced into the buckets while minimizing spillage of material between the buckets.

Other features and advantages of the present invention will become readily apparent from the following detailed description, the accompanying drawings, and the appended claims.

DETAILED DESCRIPTION

Figure 1:
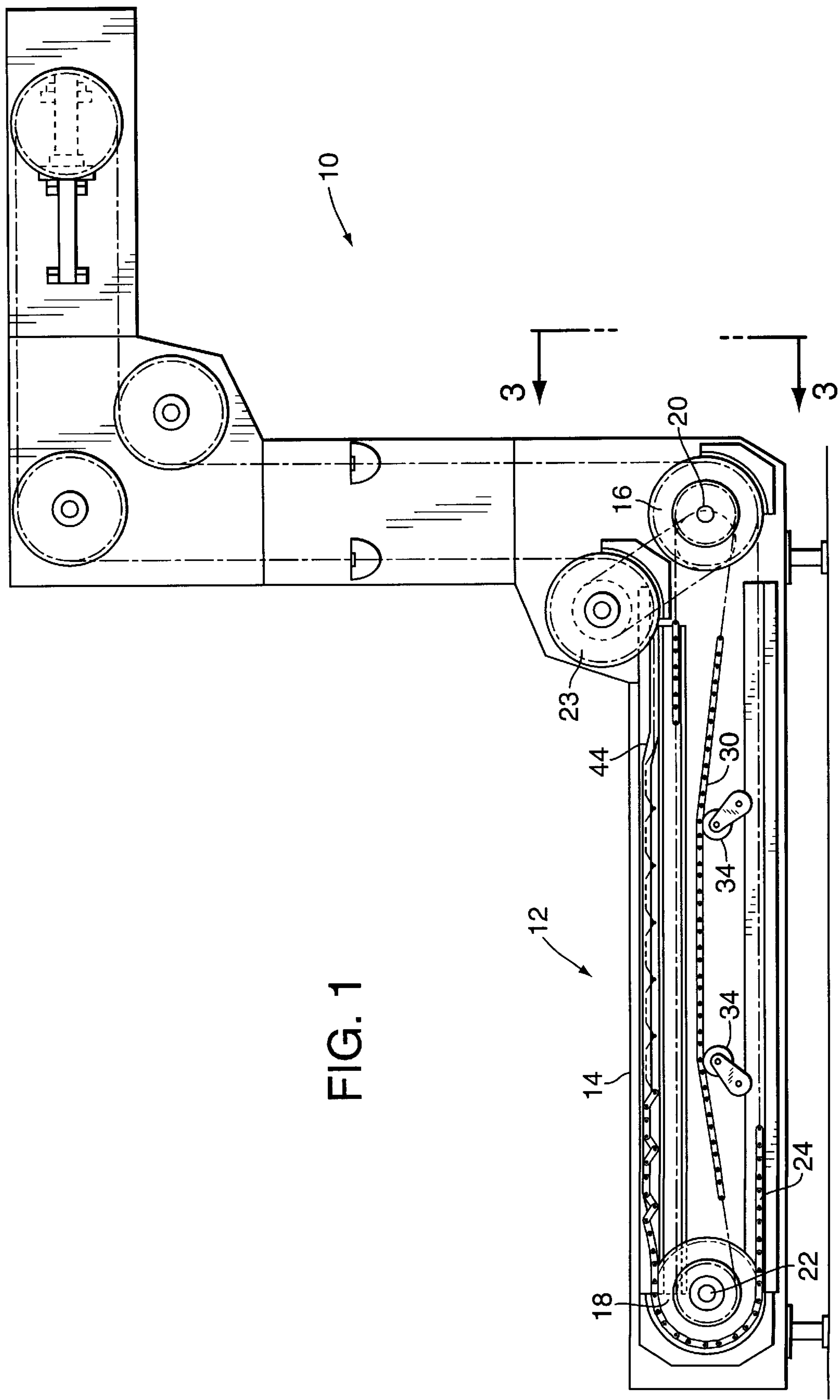
FIG. 1 is a side elevational view of a bucket conveyor apparatus embodying the principles of the present invention.

While the present invention is susceptible to embodiment in various forms, there are shown in the drawings and will hereinafter be described a presently preferred embodiment, with the understanding that the present disclosure is to be considered an exemplification of the invention, and is not intended to limit the invention to the specific embodiment illustrated.

With reference now to FIG. 1, therein is illustrated a bucket conveyor apparatus 10 embodying the principles of the present invention. As will be appreciated, the specific configuration of the conveyor apparatus can be widely varied, and include portions which extend upwardly and downwardly, as well as a portion configured for discharge of material from the apparatus. The present invention is particularly directed to a bucket conveyor apparatus having an improved infeed station, generally designated 12, which is configured to facilitate efficient filling of the buckets of the conveyor apparatus by relatively reducing the spacing between the buckets of the conveyor at the infeed station.

As illustrated, the conveyor apparatus 10 includes an infeed station frame 14 upon which are rotatably mounted at least one first sprocket 16, and at least one second sprocket 18. In accordance with the illustrated embodiment, a pair of first sprockets 16 and a pair of second sprockets 18 are respectively rotatably mounted on the infeed station frame 14 on a first drive shaft 20 mounting first sprockets 16, and a second drive shaft 22 mounting second sprockets 18. The conveyor apparatus 10 further includes at least one, or a pair as illustrated, of conveyor chains 24 which extend at least partially between the first and second sprockets 16, 18 to define an upper conveyor run and a lower conveyor run each extending at least partially between the first and second sprockets. As illustrated, one of the conveyor chains 24 extends between one of the first sprockets 16 and one of the second sprockets 18, while the other conveyor chain extends between the other one of the first sprockets and the other one of the second sprockets, with the conveyor chains 24 thus extending in parallel relationship between the first and second pairs of sprockets. As will be observed, the upper and lower conveyor runs thus defined are illustrated as each extending generally horizontally, but it will be understood that it is within the purview of the present invention that the conveyor runs at the infeed station and can be inclined rather than horizontal. In the illustrated form, the upper conveyor run extends to one or more sprockets 23, driven by a one-to-one reversing drive from shaft 20.

Drive of the conveyor apparatus can be effected by an electric drive motor which operates through a suitable drive sprocket 28 and torque limiter 29 to effect driven rotation of first shaft 20, thus effecting driven rotation of first sprockets 16. In order to effect conjoint and synchronous rotation of the first sprockets 16 and the second sprockets 18, the present apparatus includes a timing chain 30 which operatively connects the first and second pairs of sprockets. The timing chain extends about a pair of timing sprockets 32 respectively mounted on the first and second shafts 20, 22 with one or more chain tensioners 34 preferably provided in engagement with the timing chain for precluding any slippage of the timing chain with respect to the timing sprockets 32. A phase lock 35 can optionally be provided for mounting one of the timing sprockets 32 on the first shaft 20, thus facilitating adjustment of the phase angle between the first shaft 20 and its associated timing sprocket.

Thus, operation of the drive motor acts to drive sprocket 28, via torque limiter 29, thus effecting driven rotation of first shaft 20 and the first sprockets 16 mounted thereon. In turn, first shaft 20 effects rotation of its associated timing sprocket 32, which in turn acts through timing chain 30 to drive second shaft 22, and second sprockets 18 mounted thereon, via the timing sprocket 32 mounted on the second shaft 22. Thus, the motor effects driving of the first pair of sprockets 16, with the timing chain 30 effecting power transmission to the second pair of second sprockets 18.

Material conveyance is effected by the provision of a plurality of conveyor buckets 36 which are pivotally mounted on and each extend between the pair of conveyor chains 24 in spaced apart relationship to each other. As the conveyor chains, and buckets mounted thereon, are moved along the lower run of the conveyor apparatus, the buckets are maintained in this spaced apart relationship to each other. In contrast, and in accordance with the present invention, the spacing between the buckets is relatively reduced along at least a portion of the upper run of the conveyor. This reduction in relative spacing is effected by a guide arrangement which acts to control slack provided in the conveyor chains along the upper run, thereby facilitating filling of the buckets at the infeed station.

The conveyor buckets 36 of the apparatus are each pivotally mounted on the conveyor chains 24 by respective mounting elements, which mounting elements are preferably provided in the form of pins 38 which pivotally interconnect adjacent pairs of the plurality of links 40 which form each of the chains. In turn, portions of each chain intermediate the mounting elements provided by pins 38 each preferably include at least one guide roller 42. The guide rollers 42 extend laterally outwardly of each of the conveyor chains 24 and are preferably mounted on pins which further interconnect the links 40 of each of the conveyor chains. In the illustrated embodiment, three of the rollers 42 are respectively provided on three of the pins of the conveyor chains interconnecting links thereof, between each adjacent pair of the mounting elements 38 on which the buckets 36 are pivotally mounted.

Figure 2:
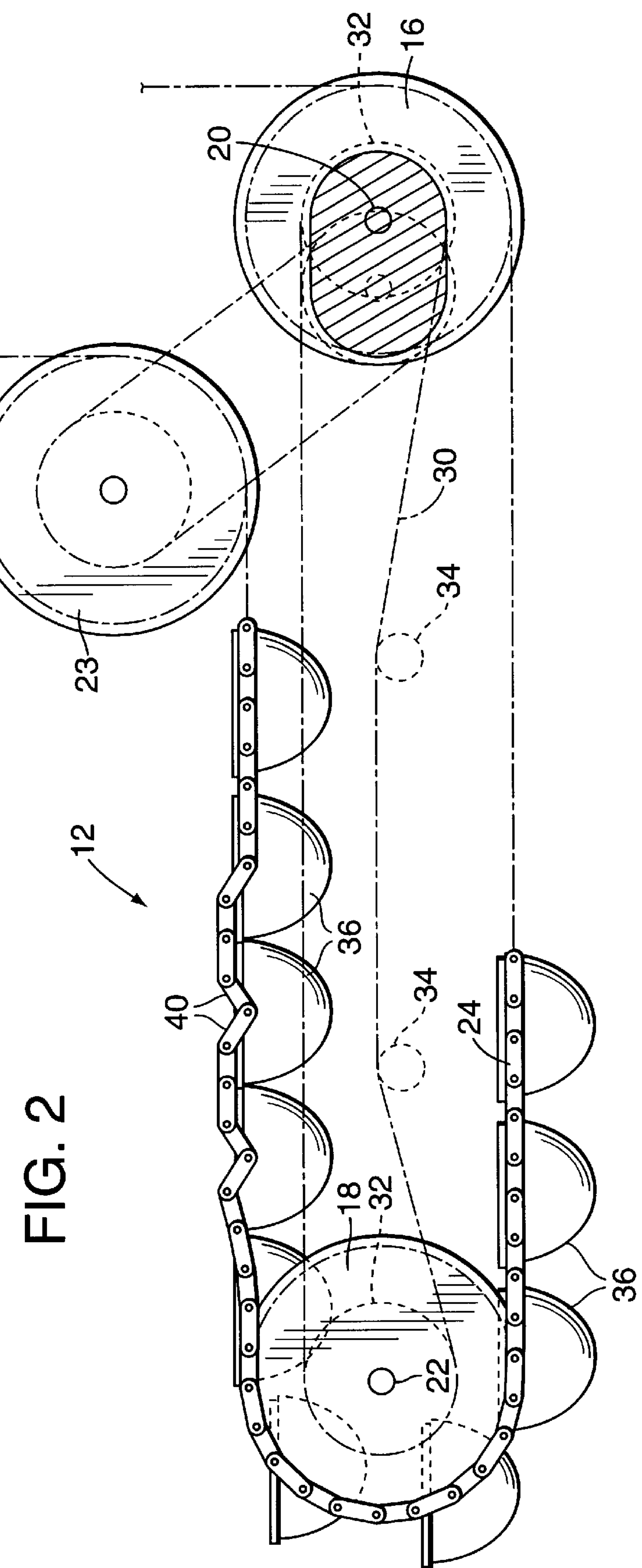
FIG. 2 is a diagrammatic view of an infeed station of the conveyor apparatus illustrated in FIG. 1.

By this arrangement of guide rollers, each of the conveyor chains 24 is thus configured to cooperate with a pair of chain guide members 44 which extend in parallel relationship to each other along at least a portion of the upper conveyor run. Each guide member 44 has a generally stepped configuration, with each guide member providing a first guide path, and a second guide path spaced vertically above the first guide path. As best illustrated in FIG. 2, the mounting elements 38 on which buckets 36 are mounted are guided along the first, lower guide path of the guide members 44, while portions of each chain intermediate the mounting elements are guided by guide rollers 42 along the second, upper path of each of the guide members 44.

Figure 3:
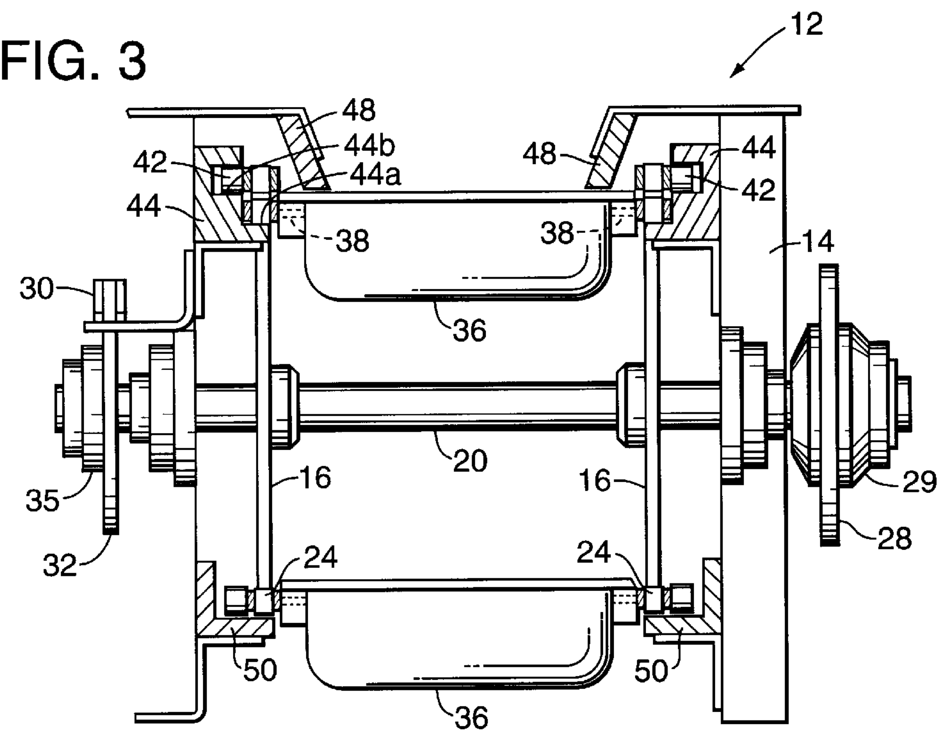
FIG. 3 is a cross-sectional view taken generally along lines 3—3 of FIG. 1.

FIG. 3 illustrates the first guide path is embodied as a flat surface 44*a* and the second guide path is embodied as an inwardly open channel 44*b* elevated above and horizontally offset outwardly of the flat surface 44*a*.

Figure 4:
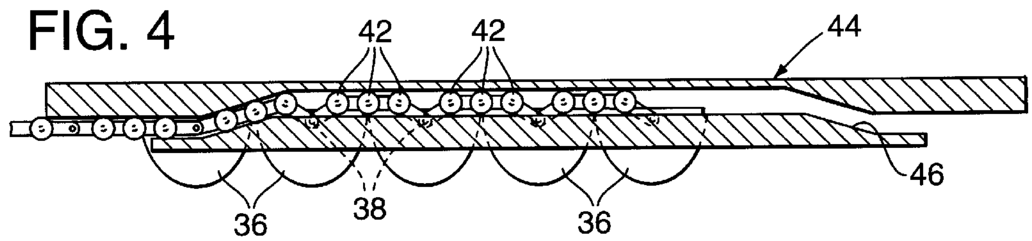
FIGS. 4 and 5 are fragmentary views further illustrating the bucket conveyor apparatus of the present invention.
Figure 5:
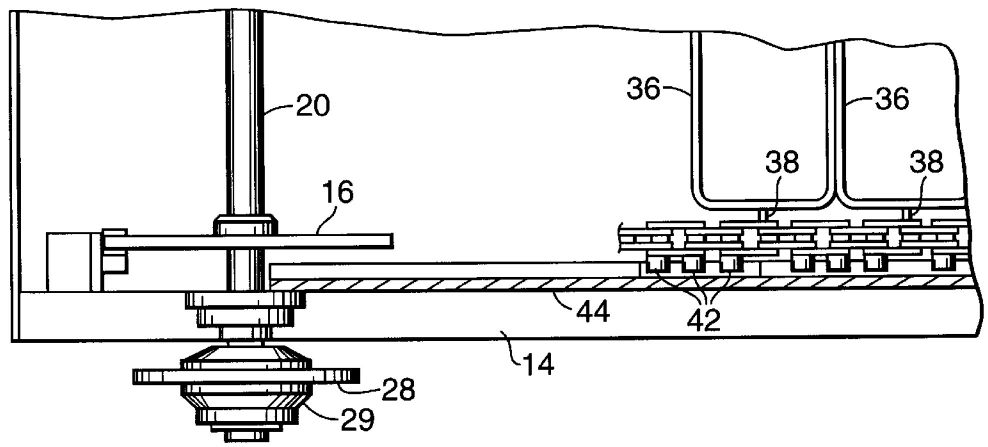

As illustrated in FIG. 4, each of the guide members 44 includes a gate portion 46 at the upstream end thereof, which acts to move the guide rollers (and the associated chain portions) upwardly along the second guide path, while mounting elements 38 (and the buckets carried thereby) are guided along the lower guide path of the guide members 44.

As will be appreciated, this configuration of the guide members 44 acts to reduce the effective length of the conveyor chains 24 as the conveyor chains, and associated buckets, are moved along this portion of the upper conveyor run. As a consequence, the relative spacing between the buckets is relatively reduced, preferably such that the buckets are positioned in substantially adjacent relationship with each other along this portion of the upper run. Efficient loading of material into the conveyor buckets at the infeed station is thus facilitated since spillage of material between the buckets is substantially abated. In the preferred form, a pair of infeed skirts 48 are respectively positioned above the pair of guide members 44 for directing material between the guide member and into the conveyor buckets 36. If desired, the buckets can be positioned to overlap attendant to the reduction of relative spacing therebetween, thus further abating spillage of material between the buckets during loading. A pair of lower chain guides 50 can also be provided along the lower conveyor run.

From the foregoing, it will be observed that numerous modifications and variations can be effected without departing from the true spirit and scope of the novel concept of the present invention. It is to be understood that no limitation with respect to the specific embodiment illustrated is intended or should be inferred. The disclosure is intended to cover all such modifications that fall within the scope of the appended claims.

What is claimed:

1. A bucket conveyor apparatus, comprising:

an infeed station frame;

at least one first sprocket and at least one second sprocket rotatably mounted on said infeed station frame;

at least one conveyor chain extending at least partially between said first and second sprockets to define an upper conveyor run and a lower conveyor run, each extending at least partially between said first and second sprockets;

a plurality of conveyor buckets each having a mounting element for mounting said buckets on said conveyor chain in spaced apart relationship to each other;

a plurality of guide rollers, said conveyor chain carrying at least one of said guide rollers intermediate adjacent buckets;

means for driving said first and second sprockets for conjoint rotation to thereby move said conveyor chain and said conveyor buckets mounted thereon along said upper and lower runs; and a stepped guide member positioned along at least a portion of said upper conveyor run for reducing the relative spacing between said conveyor buckets as said conveyor buckets are moved along said portion of said upper conveyor run to facilitate filling of said buckets, said stepped guide member having a flat surface forming a first guide path and an inwardly open channel portion forming a second guide path, said mounting elements guided along said first guide path, and said guide rollers supported for rotation along said second guide path, said second guide path at a different elevation than said first guide path.

2. A bucket conveyor apparatus in accordance with claim 1, wherein:

said means for driving said first and second sprockets includes timing chain means respectively connected to said sprockets for maintaining said sprockets in synchronous rotation with each other.

3. A bucket conveyor in accordance with claim 2, wherein:

said means for driving said first and second sprockets includes drive motor means for driving one of said sprockets, said timing chain means effecting power transmission to the other of said sprockets.

4. A bucket conveyor in accordance with claim 1, wherein:

said conveyor chain comprises a plurality of chain pins, spaced apart ones of said chain pins providing said mounting elements for mounting said conveyor buckets, at least one of the chain pins intermediate each adjacent pair of said mounting elements having one of said guide rollers for guiding said portions of said conveyor chain intermediate said mounting element along said second guide path.

5. A bucket conveyor apparatus, comprising:

an infeed station frame;

a pair of first sprockets and a pair of second sprockets rotatably mounted on said infeed station frame;

a pair of conveyor chains each extending at least partially respectively between one of said first sprockets and second sprockets, in parallel relationship to each other, to define an upper conveyor run and a lower conveyor run each extending at least partially between said pair of first sprockets and said pair of second sprockets;

a plurality of conveyor buckets each having a mounting element for mounting said buckets on, and each bucket extending between, said pair of conveyor chains in spaced apart relationship to each other;

a plurality of guide rollers, said conveyor chains each carrying two or more of said guide rollers in series, intermediate adjacent buckets;

means for driving said first and second pair of sprockets for conjoint rotation operatively connected between said first and second pair of sprockets, to thereby move said conveyor chains and said conveyor buckets mounted thereon along said upper and lower conveyor runs, said means for driving independent of said pair of conveyor chains; and a stepped guide member positioned along at least a portion of said upper conveyor run for reducing the effective length of each said conveyor chain along said portion of said upper conveyor run to thereby reduce the relative spacing between said conveyor buckets as said conveyor buckets are moved along said portion of said upper conveyor run to thereby facilitate filling of said buckets, said stepped guide member having a first guide path and a second guide path, said mounting elements guided along said first guide path, and said guide rollers supported for rotation along said second guide path, said first and second guide paths being spaced apart vertically.

6. A bucket conveyor apparatus in accordance with claim 5, wherein:

said means for driving said first and second pair of sprockets includes a timing chain operatively connecting said first pair of sprockets to said second pair of sprockets for maintaining said pairs of sprockets in synchronous rotation with each other.

7. A bucket conveyor apparatus comprising:

an infeed station frame;

a pair of first sprockets and a pair of second sprockets rotatably mounted on said infeed station frame;

a pair of conveyor chains each extending at least partially respectively between one of said first sprockets and said second sprockets, in parallel relationship to each other, to define an upper conveyor run and a lower conveyor run each extending at least partially between said pair of first sprockets and said pair of second sprockets;

a plurality of conveyor buckets mounted on, and each bucket extending between, said pair of conveyor chains in spaced apart relationship to each other;

means for driving said first and second pairs of sprockets for conjoint rotation to thereby move said conveyor chains and said conveyor buckets mounted thereon along said upper and lower conveyor runs;

each of said conveyor chains comprises a plurality of chain links pivotally interconnected by a plurality of chain pins, spaced apart ones of said chain pins providing mounting elements for mounting said conveyor buckets between said pair of conveyor chains; and a pair of guide members respectively operatively engageable with said conveyor chains to guide said mounting elements of each conveyor chain along a first guide path, and to guide portions of each said conveyor chain intermediate said mounting elements along a second guide path spaced vertically from said first guide path, said guide members having a flat surface forming said first guide path and an elevated channel forming said second guide path.

8. A bucket conveyor apparatus in accordance with claim 7, wherein:

said portions of each said conveyor chain intermediate said mounting elements include roller means engageable with said guide members for guided movement along said second guide path.

9. A bucket conveyor apparatus in accordance with claim 7, including:

a pair of infeed skirts respectively positioned above said pair of guide members for directing material between said guide members and into said conveyor buckets.

10. A bucket conveyor apparatus, comprising:

at least one conveyor chain extending along a horizontal run;

a plurality of conveyor buckets each having a mounting element for mounting said buckets on said conveyor chain in spaced apart relationship to each other;

a plurality of guide rollers, said conveyor chains carrying at least one of said guide rollers intermediate adjacent buckets;

a guide structure including a first guide path formed as a flat surface and a second guide path formed as a channel horizontally offset from said flat surface, said channel at a different elevation than said flat surface, said mounting elements guided along said first guide path and said guide rollers supported for rotation along said second guide path.

11. The conveyor apparatus according to claim 10, wherein said guide structure includes:

first and second end regions, wherein at said first and at said second end regions said flat surface and bottom surface of said channel have a substantially equivalent elevation;

an inclined gate portion which transitions said first end region into said second guide path, and a declined gate portion which transitions said second guide path into said second end region, said gate portions acting to elevate or lower said guide rollers from/to an elevation of said mounting elements.

12. A bucket conveyor apparatus in accordance with claim 10 comprising:

at least one first sprocket and at least one second sprocket, and said at least one conveyor chain extending at least partially between said first and second sprockets to define said horizontal run and to define a lower conveyor run which extends partially between said first and second sprockets; and a motor drive operatively connected to said first and second sprockets for conjoint rotation to thereby move said conveyor chain and said conveyor buckets mounted thereon, along said upper and lower runs.

13. A bucket conveyor apparatus according to claim 12, wherein said drive includes a timing chain respectively connected to said sprockets for maintaining said sprockets in synchronic rotation with each other.

14. A bucket conveyor apparatus according to claim 10, wherein said at least one conveyor chain includes four chain links in series between each of said mounting elements, and said guide rollers are held rotationally on chain pins which connect each of said four links together, three of said guide rollers arranged in series along said chain between each of said mounting elements.

15. A bucket conveyor apparatus, comprising:

an infeed station frame;

at least one first sprocket and at least one second sprocket rotatably mounted on said infeed station frame;

at least one conveyor chain extending at least partially between said first and second sprockets to define an upper conveyor run and a lower conveyor run each extending at least partially between said first and second sprockets;

a plurality of conveyor buckets mounted on said conveyor chain in spaced apart relationship to each other;

a first timing chain respectively operatively connected to said first and second sprockets for maintaining said first and second sprockets in conjoint rotation with each other, said timing chain independent of said conveyor chain;

at least one third sprocket arranged at an end of said upper conveyor run in a chain moving direction, receiving conveyor chain from said second sprocket; and a second timing chain driven respectively operatively connected to said first and third sprockets for maintaining said first and third sprockets in conjoint rotation with each other.

16. A bucket conveyor in accordance with claim 15, wherein:

said means for driving said first and second sprockets includes a drive motor mechanically connected to rotate for driving one of said sprockets, said timing chain effecting rotary power transmission to the other of said sprockets.

17. The apparatus according to claim 15, wherein said third sprocket is arranged between said first and second sprockets and engaged to said conveyor chain to direct the upper conveyor run from a horizontal path to a vertical upward path, and a fourth sprocket arranged above said first sprocket and receiving chain from said third sprocket;

said first sprocket receiving conveyor chain from said fourth sprocket, and said first and said third sprocket connected by a rotation reversing mechanism and said second timing chain for reverse conjoint rotation therebetween.

18. The apparatus according to claim 17 comprising at least one further sprocket engaged to said conveyor chain arranged between said third sprocket and said fourth sprocket.

19. The apparatus according to claim 15 further comprising a guide positioned along at least a portion of said upper conveyor run for reducing the relative spacing between said conveyor buckets as said conveyor buckets are moved along said portion of said upper conveyor run to facilitate filling of said buckets.

* * * * *